US012321330B1

(12) United States Patent
Berlinic

(10) Patent No.: US 12,321,330 B1
(45) Date of Patent: Jun. 3, 2025

(54) ENTITY RESOLUTION USING MACHINE LEARNING

(71) Applicant: Peregrine Technologies, Inc., San Francisco, CA (US)

(72) Inventor: Wyatt Wade Berlinic, Cambridge, MA (US)

(73) Assignee: Peregrine Technologies, Inc., San Francisco, CA (US)

( * ) Notice: Subject to any disclaimer, the term of this patent is extended or adjusted under 35 U.S.C. 154(b) by 0 days.

(21) Appl. No.: 18/789,322

(22) Filed: Jul. 30, 2024

(51) Int. Cl.
*G06F 16/00* (2019.01)
*G06F 16/23* (2019.01)

(52) U.S. Cl.
CPC ................... *G06F 16/2329* (2019.01)

(58) Field of Classification Search
CPC .................................................. G06F 16/2329
See application file for complete search history.

(56) References Cited

U.S. PATENT DOCUMENTS

| | | | |
|---|---|---|---|
| 8,731,971 B1 | 5/2014 | O'Neill et al. | |
| 10,733,157 B1 | 8/2020 | Johnston | |
| 10,929,441 B1 | 2/2021 | Phillips | |
| 12,050,572 B1 * | 7/2024 | Ambrose | G16H 10/60 |
| 12,182,725 B2 * | 12/2024 | Meyerzon | G06F 16/26 |
| 2018/0276280 A1 * | 9/2018 | Trudel | G06F 16/2456 |
| 2019/0303371 A1 | 10/2019 | Rowe | |
| 2021/0224237 A1 * | 7/2021 | Faruquie | G06N 5/01 |
| 2021/0224258 A1 * | 7/2021 | Faruquie | G06F 16/244 |
| 2021/0294481 A1 | 9/2021 | Morris | |
| 2021/0303638 A1 * | 9/2021 | Zhong | G06F 40/169 |
| 2021/0311952 A1 * | 10/2021 | Jain | G06F 16/24578 |
| 2022/0004565 A1 | 1/2022 | Webber | |
| 2022/0004568 A1 | 1/2022 | Patil | |
| 2022/0158982 A1 | 5/2022 | Greene | |
| 2023/0342558 A1 * | 10/2023 | Wang | G06F 40/295 |
| 2024/0020479 A1 * | 1/2024 | Singh | G06F 40/284 |
| 2024/0126732 A1 | 4/2024 | Ablitt | |

OTHER PUBLICATIONS

Author Unknown, "Megagonlabs/Sudowoodo: The Source Code of the Sudowoodo Paper in ICDE 2023", retrieved from <https://github.com/megagonlabs/sudowood>, 2023.

(Continued)

*Primary Examiner* — Syed H Hasan
(74) *Attorney, Agent, or Firm* — Van Pelt, Yi & James LLP

(57) ABSTRACT

A plurality of entity records is received. A machine learning model is used to embed a version of the plurality of entity records into embeddings. The embeddings are used to determine candidate relationships between the plurality of entity records. The determined candidate relationships are analyzed to determine one or more groups of related entity records included in the plurality of entity records. Each of the one or more groups of related entity records identify a corresponding common underlying entity. For a specific entity record group included in the determined one or more groups of related entity records, a new merged entity record is created. The new merged entity record merges elements of individual related entity records included in the specific entity record group.

20 Claims, 13 Drawing Sheets

(56) References Cited

OTHER PUBLICATIONS

Benjamin Bengfort, "A Primer on Entity Resolution", retrieved from <https://www.slideshare.net/slideshow/a-primer-on-entity-resolution/50531906>, Jul. 14, 2015.
Binette et al., "(Almost) all of entity resolution", Science Advances | Review, retrieved from <https://www.science.org>, Mar. 25, 2022.
Christophides et al., "End-to-End Entity Resolution for Big Data: A Survey", vol. 1, No. 1, Aug. 2020.
Flávio Juvenal da Silva Junior, "Talk: Flávio Juvenal da Silva Junior—1+1=1 or Record Deduplication with Python" and machine transcription of video presented at <https://www.youtube.com/watch?v=eMI8lwQl3Dc>, Apr. 29, 2020.
Flávio Juvenal, "1+1=1 or Record Deduplication with Python", retrieved from <https://nbviewer.org/github/vintasoftware/deduplication-slides/blob/master/slides-reduced.ipynb>, PyCon US, 2018.
Flávio Juvenal, "1+1=1 or Record Deduplication with Python", retrieved from <https://nbviewer.org/github/vintasoftware/deduplication-slides/blob/pycon-2020/slides-with-dedupe-2.ipynb>, PyCon US, 2020.
Flávio Juvenal, "1+1=1 or Record Deduplication with Python | Flávio Juvenal @ PyBay2018" and machine transcription of video presented at <https://www.youtube.com/watch?v=McsTWXeURhA>, Oct. 17, 2018.
Ge et al., "CollaborER: A Self-supervised Entity Resolution Framework Using Multi-Features Collaboration", Sep. 2, 2021.
Li et al., "Deep Entity Matching with Pre-Trained Language Models", Sep. 2, 2020.
Peter Christen, "Data Matching: Concepts and Techniques for Record Linkage, Entity Resolution, and Duplicate Detection", ISBN No. 978-3-642-31163-5, Published Jul. 5, 2012.
Rossetti et al., "Basics of Entity Resolution with Python and Dedupe", District Data Labs, retrieved from <https://medium.com/district-data-labs/basics-of-entity-resolution-with-python-and-dedupe-bc87440b64d4>, Jan. 3, 2018.
Wang et al., "Sudowoodo: Contrastive Self-supervised Learning for Multi-purpose Data Integration and Preparation", retrieved from <https://arxiv.org/abs/2207.04122>, Oct. 10, 2022.
Fumiko Kobayashi, A design for an identity resolution service as an extension of the entity identity information management model, Diss. University of Arkansas at Little Rock, 2015, 24 pages.
Kang et al., Interactive entity resolution in relational data: A visual analytic tool and its evaluation, IEEE transactions on visualization and computer graphics vol. 14, No. 5, Oct. 2008, pp. 999-1014.
Kristi Morton, Interactive Data Integration and Entity Resolution for Exploratory Visual Data Analytics, Diss., 2015, 144 pages.
Wang et al., Rule-based entity resolution on database with hidden temporal information, IEEE Transactions on Knowledge and Data Engineering 30.11, Nov. 2018, pp. 2199-2212.
Whang et al., Incremental entity resolution on rules and data, The VLDB journal 23, 2014, pp. 77-102.
Finlay et al., Criminal justice administrative records system (cjars). Ann Arbor: University of Michigan, Institute for Social Research, Mar. 22, 2021, 247 pages.

* cited by examiner

ENTITY RESOLUTION USING MACHINE LEARNING

BACKGROUND OF THE INVENTION

Digital record keeping is used to track complex relationships between data such as for entity data. When aggregating data from multiple sources and users, instances can arise where there is an excessive number of records including duplicative records and multiple records associated with the same entity. When multiple entity records exist for a single entity, such as an entity representing a real-world object or person, difficulties locating related entity records and differences in record creation and formatting can cause performance and accuracy issues when performing entity record analysis. Therefore, there exists a need for a more effective way to manage and analyze entity records.

BRIEF DESCRIPTION OF THE DRA WINGS

Various embodiments of the invention are disclosed in the following detailed description and the accompanying drawings.

FIG. 9 is a diagram illustrating an embodiment of a user interface for visualizing a merged entity record.

FIG. 11 is a diagram illustrating an embodiment of a user interface for visualizing a merged entity record and its connections.

DETAILED DESCRIPTION

Figure 1:
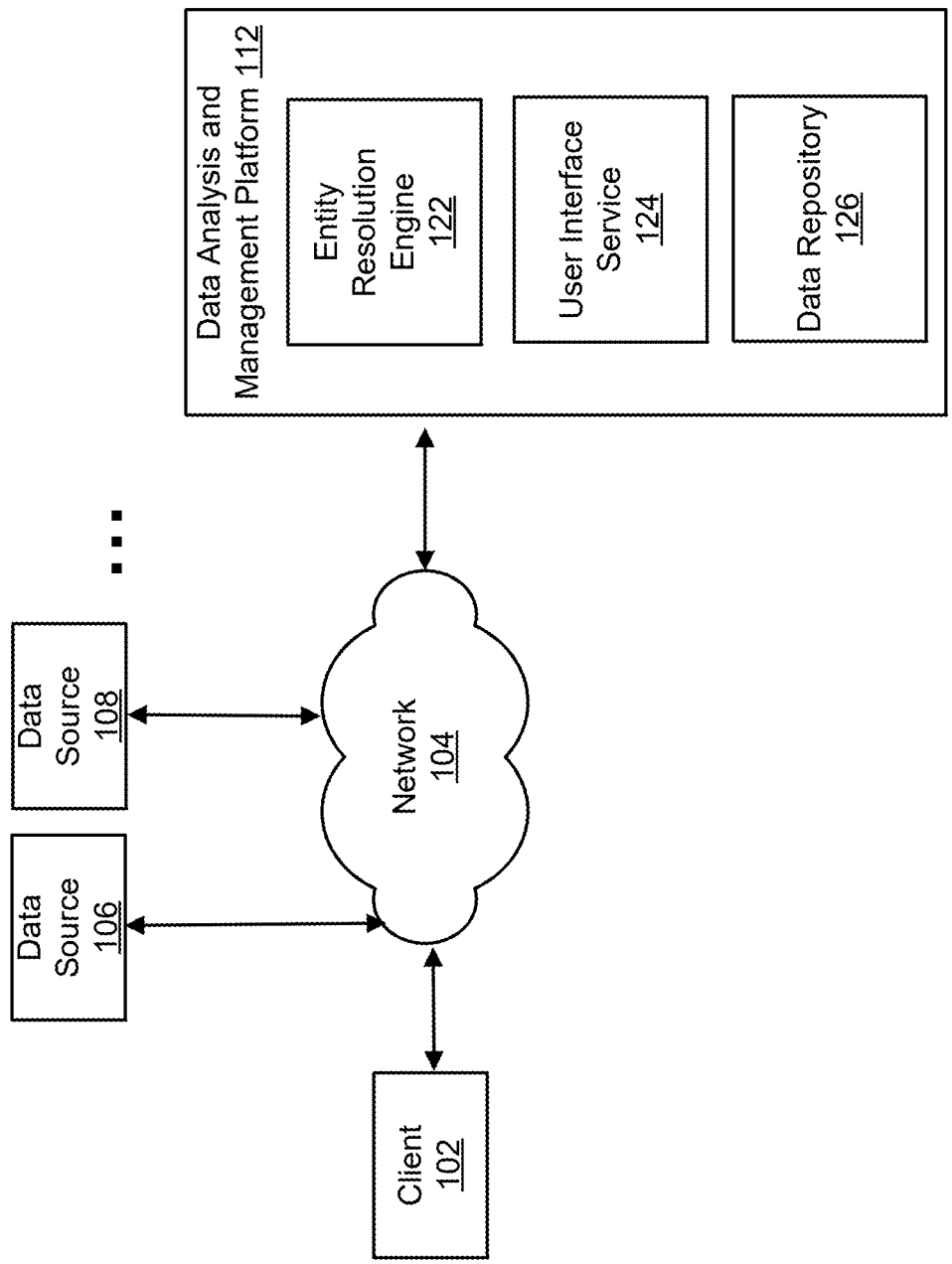
FIG. 1 is a block diagram illustrating an example of a network environment for a data analysis and management platform and service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Entity record resolution (e.g., deduplication and related record merging) is disclosed. For example, a collection of entity records is analyzed to automatically identify groups of related entity records. In some embodiments, the collection of entity records can represent real-world entities such as persons or real-world objects and each identified group of related entity records corresponds to a common underlying entity such as a particular person or real-world object. For each identified common entity corresponding to an identified group of related entity records, a new merged entity record is created. The newly created entity record merges elements from the individual records of the group without modifying the original individual records. The merged records provide a more streamlined and insightful access to entity data. Moreover, by retaining the original individual entity records in addition to the newly created merged records, a user can easily switch between optionally enabling and disabling merged records and/or original individual entity records to maintain data source traceability and compatibility with previously existing references and applications that still rely on the original individual entity records.

In some embodiments, a plurality of entity records is received. For example, a collection of entity records corresponding to persons or real-world objects is received from a plurality of different data sources at a data analysis and management platform utilized by a law enforcement agency. The plurality of entity records is processed to determine one or more groups of related entity records included in the plurality of entity records, wherein each of the one or more groups of related entity records identifies a corresponding common underlying entity. For example, one or more groups of related entity records are identified where each of the one or more groups of related entity records corresponds to the same underlying person or real-world object. For a specific entity record group included in the determined one or more groups of related entity records, a new merged entity record that merges elements of the individual related entity records included in the specific entity record group is created while the individual related entity records of the specific entity record group as separate stored records is retained. For example, a new merged entity record is created for each group of the groups of related entity records without changing the underlying individual related entity records.

Computationally efficient entity record resolution using machine learning embeddings and clustering is disclosed. Comparing each entity record with another entity record (e.g., using a comparison algorithm) to determine whether the entity records correspond to the same underlying entity is computationally expensive and the computational complexity grows exponentially as the number of entity records increases. Machine learning embeddings can be used to efficiently reduce the number of entity record comparisons to the ones that are most likely to yield an underlying entity match. For example, a collection of entity records that represents real-world entities such as persons or real-world objects are embedded using a machine learning model, where the embedding of each entity record is a numerical representation of the entity record. Embeddings that are closer in value to each other correspond to entity records that may represent a common underlying entity, such as a particular person or real-world object. Comparisons/analyses between different entity records to identify/validate an underlying entity match are limited to ones with similar embedding values. Once valid matches are identified, they can be further clustered into potentially larger groups that still correspond to the same underlying entity, where each group of entity records identifies a common corresponding underlying entity. For each identified common underlying entity and its group of entity records, a new merged entity record is created. The newly created entity record merges elements from the individual records of the group. The merged records provide a more efficient and streamlined access to entity data, resulting in significantly improved performance for entity analysis.

In some embodiments, a plurality of entity records is received. For example, a collection of entity records corresponding to persons or real-world objects is made accessible and standardized. A machine learning model is used to embed a version of the entity records into embeddings. For example, entity records are converted and provided to a machine learning model that returns the embeddings representing the entity records. The embeddings are used to determine candidate relationships between the plurality of entity records. For example, a similarity measurement is calculated between the embeddings of entity records, and entity records with high degrees of similarity between their embeddings are paired as candidate relationships. In some embodiments, determined candidate relationships are analyzed to determine one or more groups of related entity records included in the plurality of entity records, wherein each of the one or more groups of related entity records identifies a corresponding common underlying entity. For example, candidate relationships are analyzed using a set of rules and filters and a machine learning model to validate that the entity record pair in the candidate relationship corresponds to a common underlying entity. Groups of entity record pairs with validated candidate relationships that identify a common underlying entity are clustered. Once clustered, the entity records in the group are merged into a new entity record combining the elements of the entity records in the group.

FIG. 1 is a block diagram illustrating an example of a network environment for a data analysis and management platform and service. In the example shown, client 102, data source 106, data source 108, and data analysis and management platform 112 are connected via network 104. Network 104 can be a public or private network. In some embodiments, network 104 is a public network such as the internet. Examples of network 104 include one or more of the following: a direct or indirect physical communication connection, internet, intranet, Local Area Network, Wide Area Network, Storage Area Network, and any other form of connecting two or more systems, components, or storage devices together. In various embodiments, data analysis and management platform 112 offers a user interface service 124 that implements entity resolution engine 122 as well as other data-related services. Data analysis and management platform 112 also includes data repository 126, which stores data for entity resolution engine 122 and user interface service 124. Data analysis and management platform 112 is communicatively connected to client 102 and offers its data related services to clients such as client 102. For example, client 102 utilizes data analysis and management platform 112 to visualize, analyze, and evaluate the data stored in data repository 126.

In some embodiments, client 102 is an example client for accessing data-related services offered by data analysis and management platform 112. For example, client 102 can be a network device such as a desktop computer, a laptop, a tablet, or another network computing device. As a network device, client 102 can access services offered by data analysis and management platform 112 including the ability to visualize and manipulate data from data repository 126 using user interface service 124. The data from data repository 126 may include data processed by entity resolution engine 122. For example, client 102 can visualize and manipulate merged entities created by entity resolution engine 122 through the user interface service 124.

In some embodiments, data source 106 and data source 108 provide entity records to platform 112. An organization may want to collate, manage, and analyze entity records from various existing databases and records management systems, and data analysis and management platform 112 collects the record data from these various data sources for a user and/or an organization of client 102. For example, data source 106 and data source 108 include various different record management systems that provide entity record data to platform 112 via network 104 for analysis and management. Data source 106 and data source 108 may provide updated entity records periodically and/or dynamically. The received entity records are cached and/or stored by platform 112 in repository 126. In various embodiments, data source 106 and data source 108 include one or more storage systems (e.g., a database, file system, record management system, or cloud-based storage system accessed via an Application Programming Interface). The data from data source 106 and/or data source 108 can be formatted as text, binary, documents, files, spreadsheets, images, databases, or any other methods of formatting data. Although two data sources are shown in the example of FIG. 1, any number of data sources may be utilized in various embodiments.

In some embodiments, data analysis and management platform 112 is a platform that offers multiple data analysis and management services accessible through user interface service 124. The platform may be implemented through a website or software application. In the example shown, data analysis and management platform 112 includes entity resolution engine 122, user interface service 124, and data repository 126. In some embodiments, entity resolution engine 122 is communicatively connected to data repository 126, can perform entity resolution on data from data repository 126, and store the output of the entity resolution in data repository 126. For example, entity resolution engine 122 performs entity resolution on entity records stored in data repository 126 and stores the merged entity records and individual entity records in data repository 126. In some embodiments, user interface service 124 allows client 102 to manage and analyze data stored in data repository 126. For example, client 102 can visualize, edit, and group merged entity records and individual entity records in data repository 126 through user interface service 124.

In some embodiments, the components shown in FIG. 1 may exist in various combinations of hardware machines. Although single instances of some components have been shown to simplify the diagram, additional instances of any of the components shown in FIG. 1 may exist. For example, data analysis and management platform 112 can include one or more servers including one or more servers for entity resolution engine 122, user interface service 124, and data repository 126. The included servers can include distributed servers including web servers, application servers, and database servers, among others. Although data analysis and management platform 112 includes entity resolution engine 122, user interface service 124, and data repository 126, other services can be implemented and hosted by data analysis and management platform 112 as well. As shown in FIG. 1, client 102 is just one example of a potential client to data analysis and management platform 112. In some embodiments, components not shown in FIG. 1 may also exist.

Figure 2:
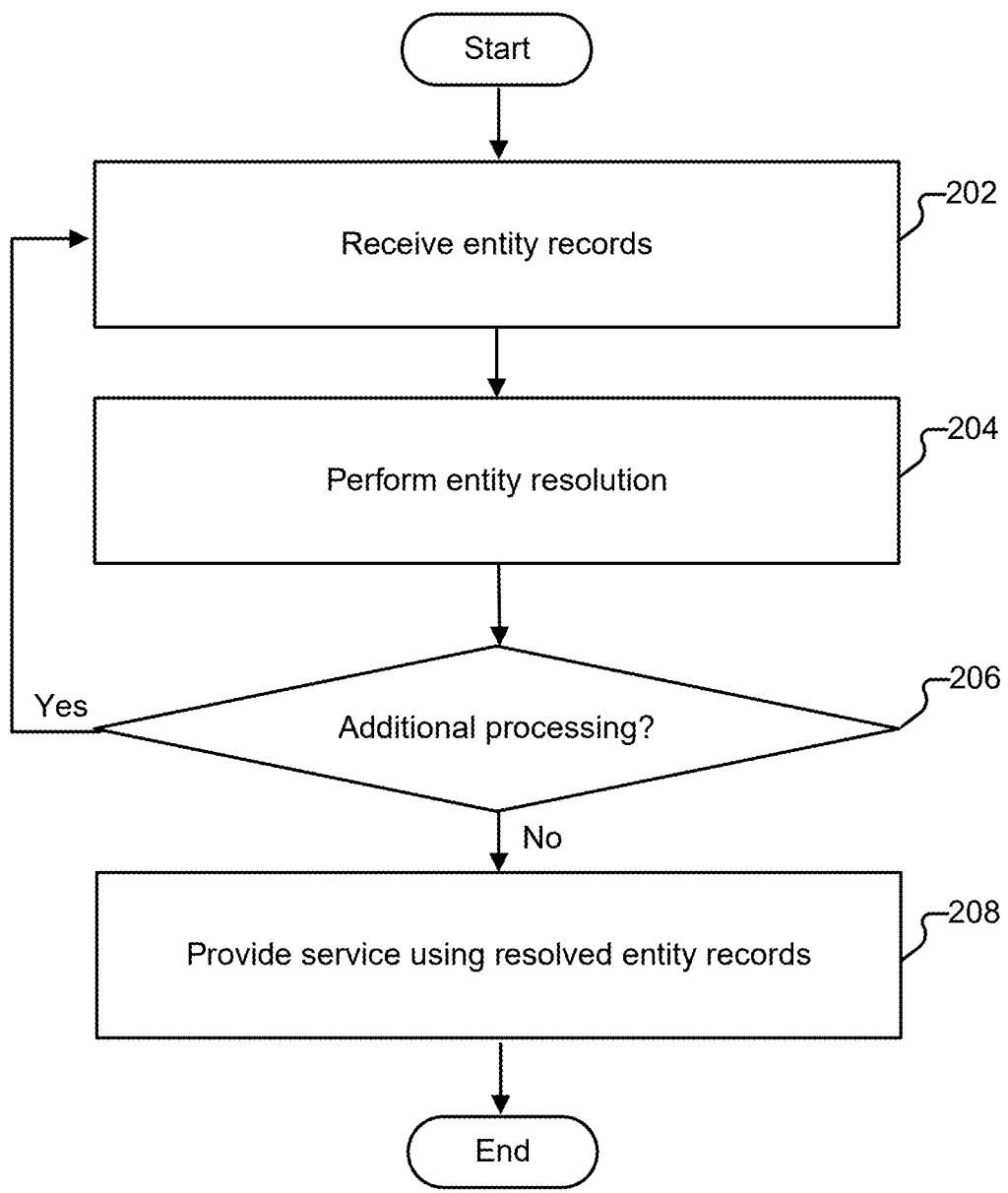
FIG. 2 is a flow chart illustrating an embodiment of a process for providing services of a data analysis and management platform.

FIG. 2 is a flow chart illustrating an embodiment of a process for providing services of a data analysis and management platform. For example, using the process of FIG. 2, the data analysis and management platform can receive and process data and provide a variety of functions for data analysis to the user, including at least entity resolution. In some embodiments, the process of FIG. 2 is executed by data analysis and management platform 112 of FIG. 1. In some embodiments, the process of FIG. 2 is executed by data analysis and management platform 112 of FIG. 1 and utilizes network 104 of FIG. 1 to receive data from data source 106 and/or data source 108 of FIG. 1 and entity resolution engine 122 of FIG. 1 to perform entity resolution.

At 202, entity records are received. For example, the entity records are received from one or more data sources (e.g., databases, file systems, record management systems, and/or cloud-based storage systems) for an organization that may want to collate, manage, and/or analyze entity records from various existing data sources. In some embodiments, the entity records are received periodically. For example, entity records are synchronized at a periodic schedule to capture changes to entity records. In some embodiments, the entity records are received dynamically. For example, updates are received when changes to entity records are detected. In some embodiments, the received entity records are to be stored at a storage repository of the data analysis and management platform and the entity records are stored as corresponding individual entity records in the storage repository. In some embodiments, the entity records are transformed (e.g., standardized, normalized, extracted, formatted, etc.) before being stored. In some embodiments, entity records are associated with real world objects (e.g., for law enforcement). In some embodiments, the entity records are person records. For example, entity records include personally identifiable information (e.g., name, social security number, date of birth, etc.), physical characteristics (e.g., sex, eye color, etc.), arrest records, case records, and/or any other information associated with a person. In some embodiments, the entity records are property records. For example, entity records identify lost and/or stolen items.

At 204, entity resolution is performed. Entity resolution is performed on the entity record data received at 202. For example, ones of the entity records that identify the same underlying entity are identified. In various embodiments, entity resolution creates merged entity records from the individual entity records received at 202, in which the merged entity records each represent a common corresponding underlying entity. For example, ones of the individual entity records that correspond to the same person are merged into a new merged record so that all of the information associated with the person from different individual entity records are gathered into the same merged record. In some embodiments, the process creating the merged record does not delete or remove the previous existing individual entity records that have been merged. By retaining the previous existing individual entity records, a user can easily switch between optionally enabling and disabling in the data analysis and management platform, use of merged records and/or original individual entity records to maintain data source traceability and compatibility with previously existing references and applications that still rely on the original individual entity records.

At 206, a determination is made whether additional processing of entity records is required. For example, if there exists new, updated, or deleted entity records, it is determined that additional processing is required. In the event additional processing is required, processing loops back to 202 where updated entity records are received. In the event no additional processing is required, then no further processing is performed and the process proceeds to 208. In some embodiments, entity records that have been processed through entity resolution at 204 are sent back to 202 for additional processing. In some embodiments, additional processing is required when new data is received at 202 after 204 was executed.

At 208, service is provided using resolved entity records from 204. For example, management and analysis services for entity records including the received individual entity records from 202 and merged entity records from 204 are provided by the data analysis and management platform. In some embodiments, a user can search, view, and analyze individual and merged entity records using a user interface able to visualize related fields, charts, tables, maps, and/or connected node graphs. In some embodiments, services for data analysis include tools and interfaces that allow users to visualize individual entity records that compose a resolved/merged entity record and the connections between individual entity records that merge into a resolved entity record. As another example, a user can locate resolved/merged entity records through a search function or connection node graph. In some embodiments, a user can locate individual entity records in addition to resolved entity records. For example, individual entity record data is retained after 202 and can be accessed and visualized through the user interface provided. In some embodiments, when an existing resolved/merged entity record is to be modified, a new replacement merged entity record is created while still retaining the replaced merged entity record as inactive. In some embodiments, a visual indication is provided to a user to indicate whether the entity record is an individual entity record, an active merged record, or an inactive/replaced merged record. In some embodiments, while previous versions of replaced merged entity records are in a hidden state, if desired, the previous versions of merged entity records can be retrieved and visualized through the user interface.

In some embodiments, the service is provided via an environment/platform that allows a user or group of users to create, delete, and edit resolved/merged entity records within a specific scoped environment (e.g., sandboxed) specific to a particular investigation, analysis, and/or user or group of users. Because the scoped merged entity record is specific to the specific scoped environment, it is not available outside the specific scoped environment (e.g., not available outside the particular investigation, analysis, and/or user or group of users). In some embodiments, changes to resolved/merged entity records are scoped and not visible to users outside of the specific scoped environment. For example, addition or removal of an individual entity record from a merged record is scoped to a specific scoped environment.

Figure 3:
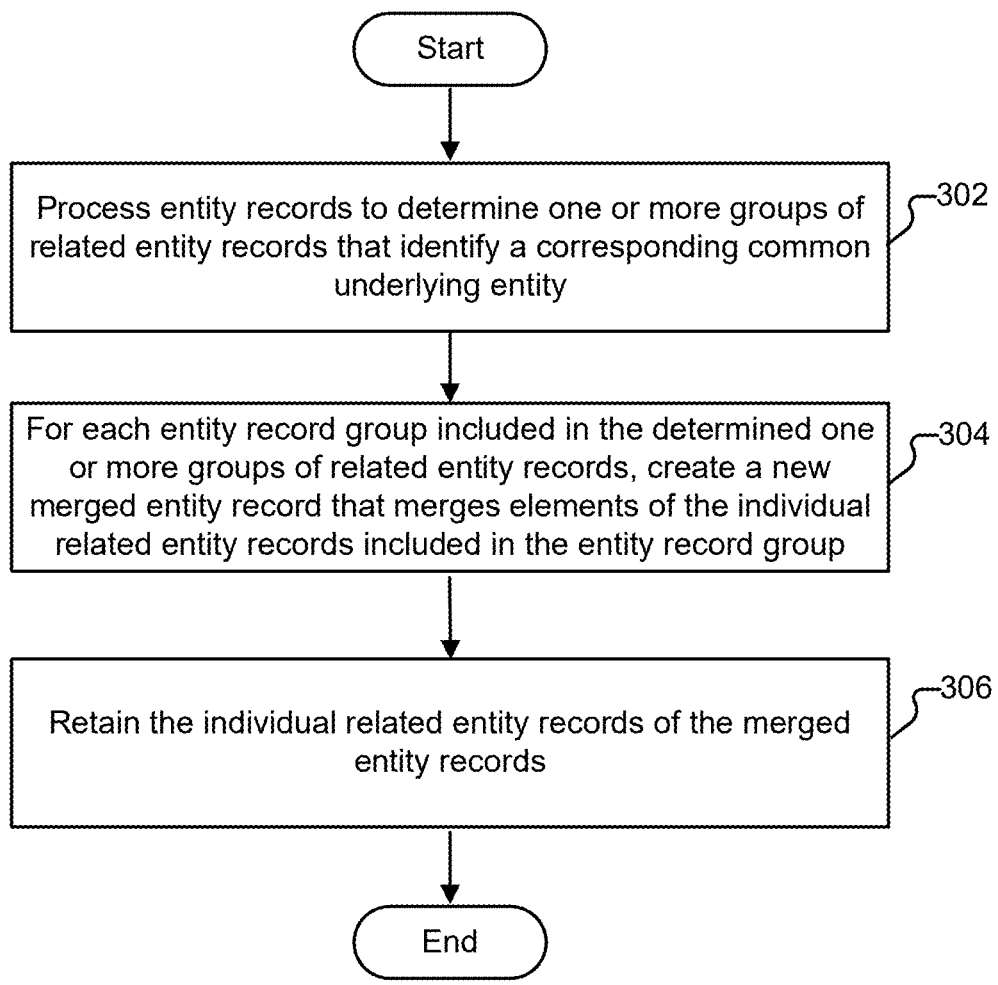
FIG. 3 is a flow chart illustrating an embodiment of a process for performing entity resolution.

FIG. 3 is a flow chart illustrating an embodiment of a process for performing entity resolution. For example, using the process of FIG. 3, entity records are processed to identify duplicate entity records and entity records referring to a common underlying entity. In some embodiments, the process of FIG. 3 is executed by data analysis and management platform 112 of FIG. 1. In some embodiments, at least a portion of the process of FIG. 3 is included in 204 of FIG. 2. In some embodiments, at least a portion of the process of FIG. 3 is executed in response to an indication by client 102 using user interface service 124 of data analysis and management platform 112 of FIG. 1. For example, a user manually edits, creates, or deletes a merged entity record using user interface service 124 of FIG. 1 and in response the process of FIG. 3 is initiated. In some embodiments, user interface service 124 of FIG. 1 provides a visual indication/icon for a merged entity record created using the process of FIG. 3. In some embodiments, user interface service 124 of FIG. 1 displays a notification banner when the process of FIG. 3 is executed.

At 302, entity records are processed to determine one or more groups of related entity records, where each group identifies a corresponding common underlying entity. For example, a matching technique is applied to determine one or more groups of related entity records that each identify a corresponding common underlying entity. Implemented matching techniques may include but are not limited to deterministic matching, probabilistic matching, rule-based matching, or machine-learning based matching. In some embodiments, the entity records are the entity records received in 202 of FIG. 2. In some embodiments, the corresponding common underlying entity is a person. For example, a plurality of entity records are person records. In some embodiments, the corresponding common underlying entity is an object. For example, a plurality of entity records are records of stolen or missing items.

At 304, for each entity record group included in the determined one or more groups of related entity records, a new merged entity record that merges elements of the individual related entity records included in the entity record group is created. In some embodiments, in a data structure that stores entity records (e.g., database of a data analysis and management platform), the new merged entity record is created. For example, for a group of individual related entity records that are all for the same person, the new merged entity record consolidates information of the group of individual related entity records into the single new merged entity record. In some embodiments, contents of the merged entity record include a copy (e.g., superset) of contents of the group of related individual entity records merged into the merged entity record. In some embodiments, rather than including a copy of the contents, the merged entity record references the group of related individual entity records being merged. Because the individual entity records being merged are retained, contents of the group of related individual entity records being merged become contents of the merged entity record via reference.

In some embodiments, the new merged entity record inherits data relationships and references of the group of related individual entity records being merged. For example, investigation/case graph connections of the individual related entity records being merged are inherited by the merged entity record. In another example, arrest records referenced by individual related entity records being merged are inherited by the merged entity record. In some embodiments, a visual indication in a user interface that the new merged entity record is of a merged record type that is different from an individual entity record type is provided. In some embodiments, an indication to view the individual related entity records of the specific entity record group is received and a list of the individual related entity records of the specific entity record group is provided by a user interface service. In some embodiments, the entity record group is scoped (e.g., sandboxed) to a particular investigation, analysis, and/or user or group of users. Because the scoped merged entity record is specific to the specific scope, it is not available outside the specific scope (e.g., not available outside the particular investigation, analysis, and/or user or group of users).

At 306, individual related entity records of the merged entity records are retained. For example, individual related entity records of the merged individual related entity records are not deleted or removed after being merged in step 304 to create the merged entity records. In some embodiments, individual related entity records of the merged individual related entity records are stored in the same data structure (e.g., database) as the merged entity records. Retaining individual related entity records of the merged entity record allows users to reference individual entity records as well as identify which entity record the information in the merged entity record was derived from. By retaining the individual entity records that have been merged, a user can easily switch between optionally enabling and disabling in the data analysis and management platform, use of merged records and/or original individual entity records to maintain data source traceability and compatibility with previously existing references and applications that still rely on the original individual entity records. In some embodiments, the individual related entity records that have been merged are marked as merged, hidden, and/or inactive in the records.

Figure 4:
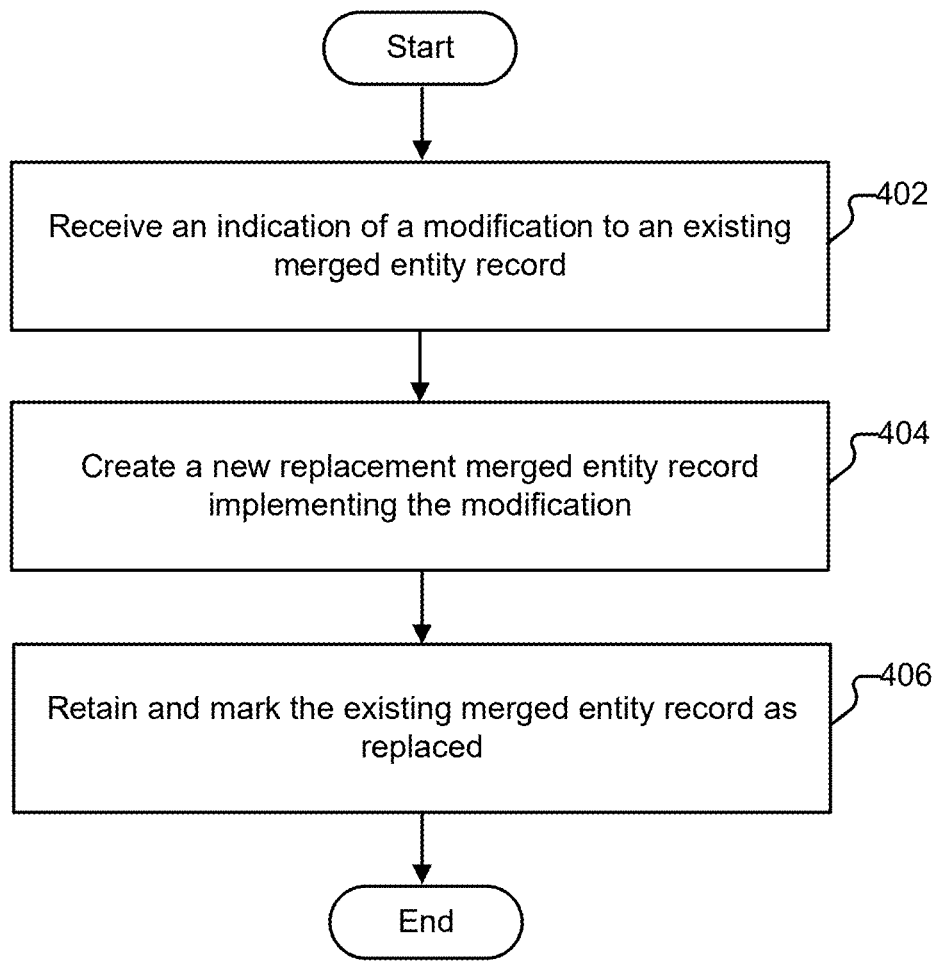
FIG. 4 is a flow chart illustrating an embodiment of a process for modifying an existing merged entity record.

FIG. 4 is a flow chart illustrating an embodiment of a process for modifying an existing merged entity record. In some embodiments, the merged entity record being modified is the merged entity record created in 304 of FIG. 3. In some embodiments, the process of FIG. 4 is executed by data analysis and management platform 112 of FIG. 1.

At 402, an indication of a modification to an existing merged entity record is received. For example, a user provides an indication of a modification to make to the existing merged entity record. The modification may include a removal of an individual entity record or an addition of an individual entity record to the group of individual entity records belonging to a merged entity record. In some embodiments, the modification is discovered automatically when the process of FIG. 2 and/or the process of FIG. 3 is executed again periodically or dynamically in response to receiving updated entity records. In some embodiments, the indication of the modification to the merged entity record is for an existing merged entity record that has been scoped to a particular investigation, analysis, and/or user or group of users.

At 404, a new replacement merged entity record implementing the modification is created. For example, rather than simply modifying the existing merged entity record to implement the modification, a new replacement merged entity record is created to implement the modification. In some embodiments, in a data structure that stores entity records (e.g., database of a data analysis and management platform), the new replacement merged entity record is created. In some embodiments, contents of the new merged entity record include a copy (e.g., superset) of contents of the modified group of related individual entity records merged into the new replacement merged entity record. In some embodiments, rather than including a copy of the contents, the replacement merged entity record references the modified group of related individual entity records being merged. In some embodiments, the new replacement merged entity record is scoped to a particular investigation, analysis, and/or user or group of users. For example, the new replacement merged entity record replaces the previously existing merged entity record only for the specific scope and does not replace the previously existing merged entity record outside the specific scope . . . .

At 406, the existing merged entity record is retained and marked as replaced. For example, the previously existing merged entity record is not deleted or removed after being replaced in step 404. Retaining the previously existing merged entity record allows a history of changes to the merged entity record to be retained as well as preserve functionality of legacy uses of the previously existing merged entity record. In some embodiments, marking the previously existing merged entity record as replaced includes modifying the previously existing merged entity record to identify it as replaced, hidden, and/or inactive. For example, the user can no longer view the previously existing merged entity records using a default search setting of a user interface. In some embodiments, marking the previously merged entity record as replaced includes providing a visual icon/indication in a user interface of a replaced status. For example, on the user interface, the existing merged entity record has a special icon, color, or any other visual change indicating that it has been replaced.

Figure 5:
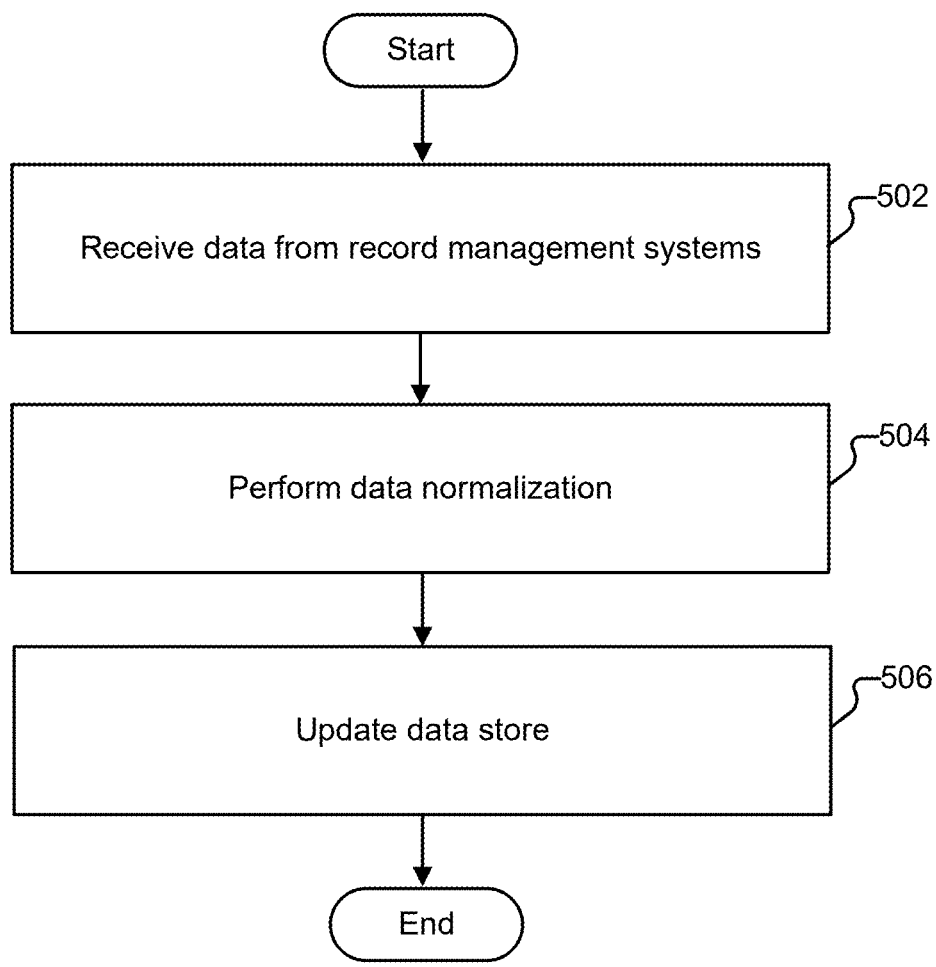
FIG. 5 is a flow chart illustrating an embodiment of a process for ingesting a plurality of entity records.

FIG. 5 is a flow chart illustrating an embodiment of a process for ingesting a plurality of entity records. For example, using the process of FIG. 5, entity record data is processed for storage in a data structure of data repository 126 of data analysis and management platform 112 of FIG. 1. In some embodiments, entity record data may come from multiple sources and are standardized using the process of FIG. 5. In some embodiments, at least a portion of the process of FIG. 5 is performed in step 202 of FIG. 2. In some embodiments, the process of FIG. 5 is performed by a data analysis and management platform such as data analysis and management platform 112 of FIG. 1.

At 502, data from record management systems is received. For example, entity record data is received through one or more of the following: file transfer protocol, universal serial bus, internet, cloud services, shared storage devices, or any other forms of transferring data. In some embodiments, data from record management systems include entity records. For example, entity records from record management systems are person records or entity records associated with real world objects for law enforcement. In some embodiments, data about the record management system is received. For example, details about the record management system are received, including information on how the record management system processes, formats, and organizes its entity record data. As another example, details on who created the record data, how the record data was created, and where the record data was created are received. In some embodiments, the record management systems are for a law enforcement-related agency.

At 504, data normalization is performed. For example, the record data received at step 502 undergoes data processing to clean and standardize the record data. In some embodiments, record data is evaluated and filtered for completeness. For example, record data with important incomplete or invalid fields is filtered out. Field importance may be determined by the fields associated with processing later in the pipeline. In some embodiments, the version of the entity records is determined by transforming the plurality of entity records from different data sources into a standardized format. For example, during data normalization, record data is modified to include the same fields and organized to have the fields appear in the same order in the record. As another example, values inside the record data may be converted into a particular format or unit for consistency. In some embodiments, data normalization includes but is not limited to filtration, transformation, authentication, and de-duplication.

At 506, the data store is updated to store the normalized data. For example, once the data has been normalized at step 504, the normalized data is stored in one or more data stores (e.g., stored in data repository 126 of FIG. 1). The data store may include one or more of the following: direct-attached storage, network-attached storage, storage area network, cloud storage, or any other form of data store. In some embodiments, the data store is updated with entries containing entity record data.

Figure 6:
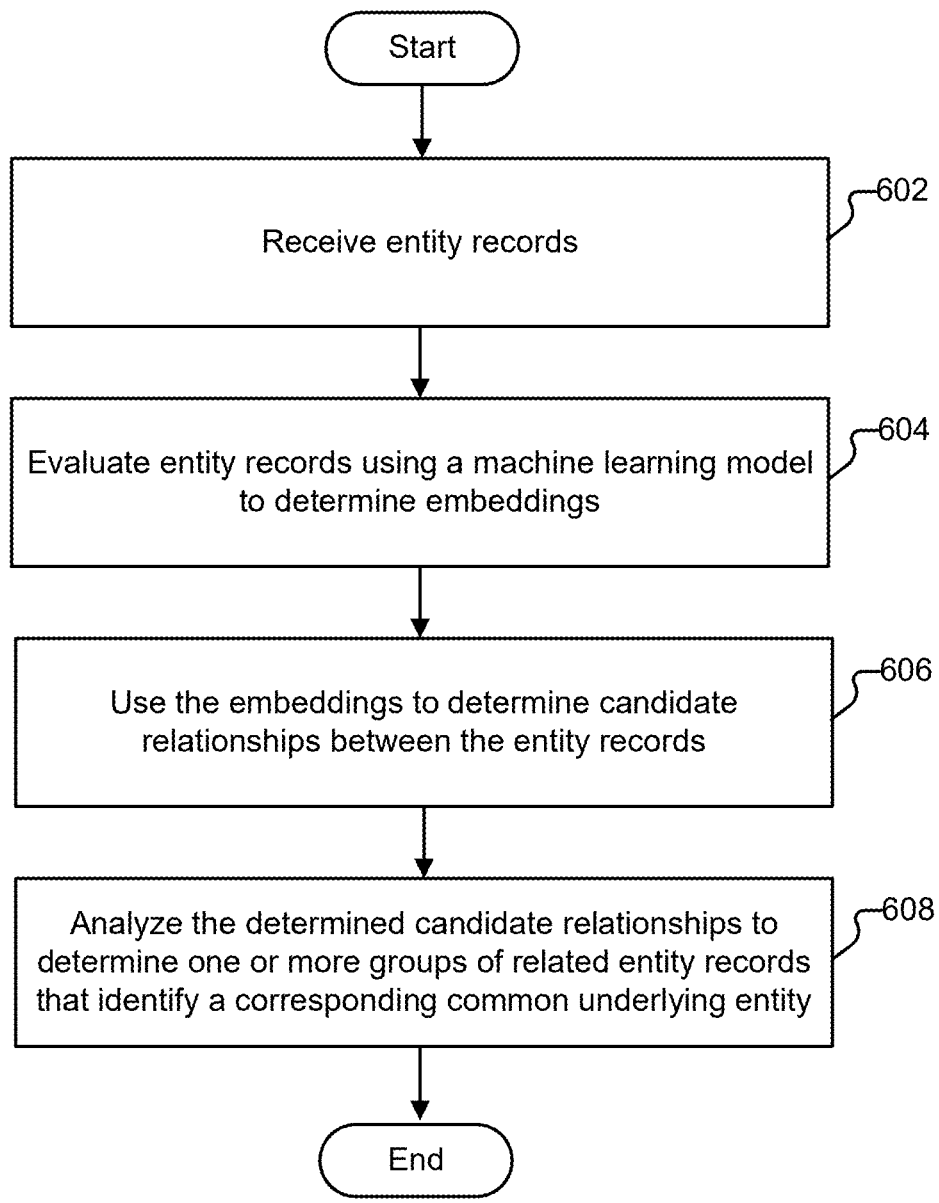
FIG. 6 is a flow chart illustrating an embodiment of a process for determining related entity records using a machine learning model.

FIG. 6 is a flow chart illustrating an embodiment of a process for determining related entity records using a machine learning model. In many instances, using a machine learning model instead of just rules-based systems to perform entity resolution is more efficient and effective due to the machine learning model's ability to learn how to identify groups of entity records that correspond to a common underlying entity and how the entity records are represented in a machine learning model. In some embodiments, the process of FIG. 6 is performed by entity resolution engine 122 of FIG. 1. In some embodiments, at least a portion of the process of FIG. 6 is performed in step 204 of FIG. 2 and/or step 302 of FIG. 3.

At 602, entity records are received. For example, the entity records are the ones received in 202 of FIG. 2 and/or stored in 506 of FIG. 5. In some embodiments, entity records are person records or entity records associated with real-world objects for law enforcement. In some embodiments, entity records are received from a data repository and the entity records have been standardized. For example, the entity records are in the same format, its data are of the same units, and each entity record contains the same set of identifying fields.

At 604, entity records are evaluated using a machine learning model to determine embeddings. For example, the entity records received at 602 are provided to the machine learning model, and the machine learning model creates the embeddings of the entity records. In some embodiments, entity records undergo preprocessing prior to being embedded using the machine learning model. For example, a filter is applied to the entity records to remove entity records with invalid and missing person names or object names to improve the data passed into the machine learning model. In some embodiments, the version of the entity records evaluated using the machine learning model is determined by transforming each of the plurality of entity records into a corresponding serialized string. In some embodiments, the version of the entity records evaluated using the machine learning model is determined including by extracting content of a subset of specified fields in an entity record included in the plurality of entity records and serializing the extracted content. For example, for each entity record, a set of data fields are extracted from the entity record, formatted as strings, and concatenated into one large string to be processed by a machine learning model. Extracted fields include but are not limited to name, date of birth, and social security number. In some embodiments, the machine learning model is a Bidirectional Encoder Representations from Transformers language model custom trained to embed entity record data. In some embodiments, each embedding is represented as a multidimensional of the same number of dimensions.

At 606, the embeddings are used to determine candidate relationships between the entity records. For example, one or more algorithms or functions are applied on the embeddings to determine candidate relationships between entity records. In some embodiments, candidate relationships between the plurality of entity records are determined using a measure of embedding similarity between the plurality of entity records. For example, embedding of each entity record is compared with each embedding of every other entity record to determine measures of similarity between all the entity records. An example of the measure of similarity between embeddings is an inner product similarity determined using a function. In some embodiments, a candidate relationship is established between a pair of entity records (e.g., determination that the pair of entity records are likely for the same underlying entity) if the measure of embedding similarity meets a threshold value. In some embodiments, for each specific entity record, its embedding is used to find a specified number of other entity records with the most similar embeddings based on the measures of similarity (e.g., inner product similarity), and the candidate relationship is established between the specific entity record and each of the specified number of other entity records with the most similar embeddings.

At 608, the determined candidate relationships are analyzed to determine one or more groups of related entity records that identify a corresponding common underlying entity. For example, the determined candidate relationships are further analyzed to determine one or more groups of related entity records that correspond to the same underly person or real-world object for law enforcement to make the related entity record determination in 302 of FIG. 3. In some embodiments, groups of related entity records are determined through computational analysis performed on the determined candidate relationships. An example of the computational analysis includes the application of filters, rules, algorithms, functions, machine learning, or any other calculation.

Figure 7:
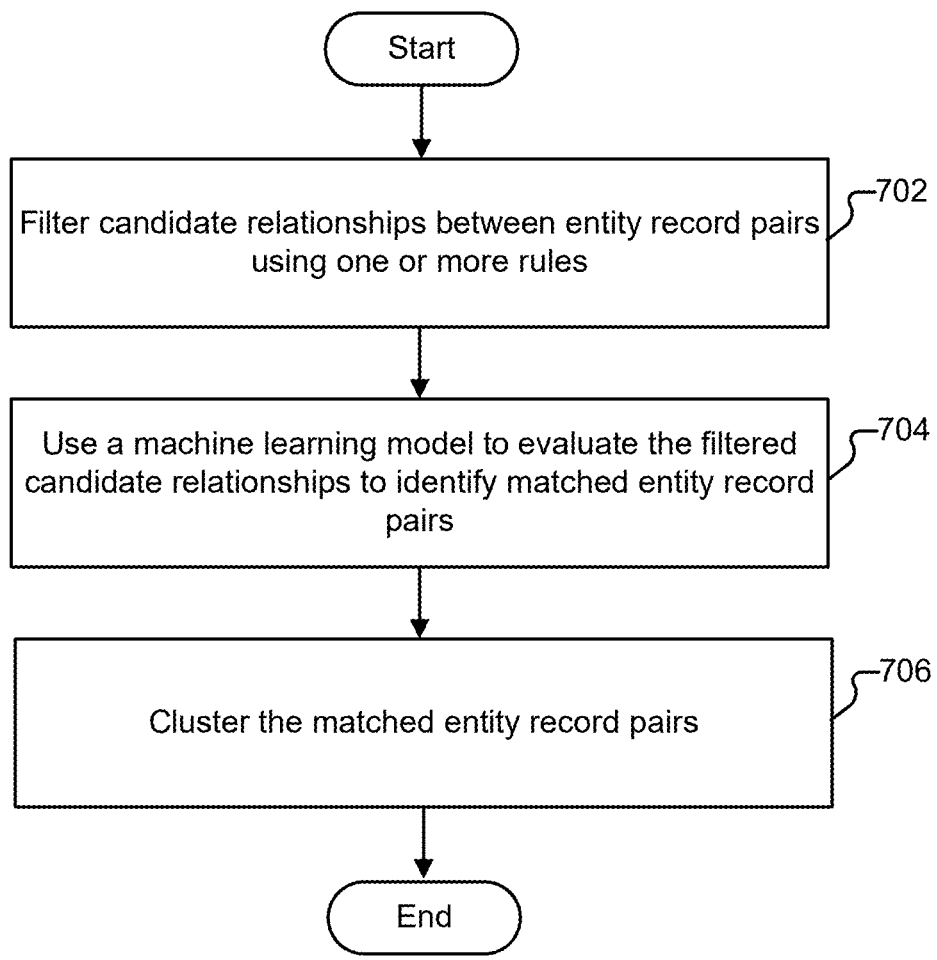
FIG. 7 is a flow chart illustrating an embodiment of a process for determining one or more groups of related entity records that identify a corresponding common underlying entity.

FIG. 7 is a flow chart illustrating an embodiment of a process for determining one or more groups of related entity records that identify a corresponding common underlying entity. For example, candidate relationships determined in 606 of FIG. 6 are analyzed for validation and candidate relationships that are determined to identity a corresponding common underlying entity are identified as groups of related entity records for merging into one or more merged entity records. In some embodiments, the process of FIG. 7 is performed by entity resolution engine 122 of FIG. 1. In some embodiments, at least a portion of the process of FIG. 7 is performed at step 608 of FIG. 6.

At 702, candidate relationships between entity record pairs are filtered using one or more rules. For example, once candidate relationships between entity record pairs have been established based on embedding matching in 606 of FIG. 6, a set of rules specifying the requirements for confirming and/or rejecting candidate relationships are applied to the candidate relationships between entity record pairs. In some embodiments, the filters are rules indicating that specific fields must match for a candidate relationship to exist between entity record pairs. For example, a rule states that if the date of birth or social security number is different, do not match the entities. Filtering candidate relationships between entity record pairs improves the efficiency of applying a machine learning model in the next step by further refining the candidate relationships to be further analyzed using the machine learning model having a computational cost.

At 704, a machine learning model is used to evaluate the filtered candidate relationships to identify matched entity record pairs. For example, data of the entity records of the filtered candidate relationships are passed into the machine learning model and the machine learning model outputs a decision as to whether the entity records of the filtered candidate relationship pair are likely for the same underlying entity. In some embodiments, the machine learning model outputs a decision on whether the entity records of the filtered candidate relationship pair correspond to the same person. For example, the machine learning model is provided personal identifying data contents of the two entity records in the candidate pair and the model outputs a score or a decision on the likelihood the two entity records are for the same underlying person. Examples of personal identifying data contents include but are not limited to: name, date of birth, and social security number. In some embodiments, the machine learning model used at 704 is a different machine learning model than at step 604 of FIG. 6. For example, the machine learning model in 704 is specifically trained to identify matching entity record pairs even if there are variations in the data, such as in formatting and spelling.

At 706, the matched entity record pairs are clustered. In some embodiments, the matched entity record pairs that are determined as identifying the same corresponding common underlying entity are further clustered together such that more than two entity records can belong to a group of entity records corresponding to the common underlying entity. For example, multiple pairs of matched entity record pairs identify the same underlying entity and are clustered together. In some embodiments, entity records that were not matched in previous steps are clustered together. For example, entity record B is matched with entity record A and entity record C, but entity record A and C are not yet matched together. During clustering, matched entity record pair A and B and matched entity record pair B and C are grouped together, indicating that entity record A, B, and C identify a common underlying entity. In some embodiments, each cluster of matched entities is used to create a merged entity record in 304 of FIG. 3. For example, a plurality of matched entity records identifying the same person are clustered and merged into a new merged entity record.

Figure 8:
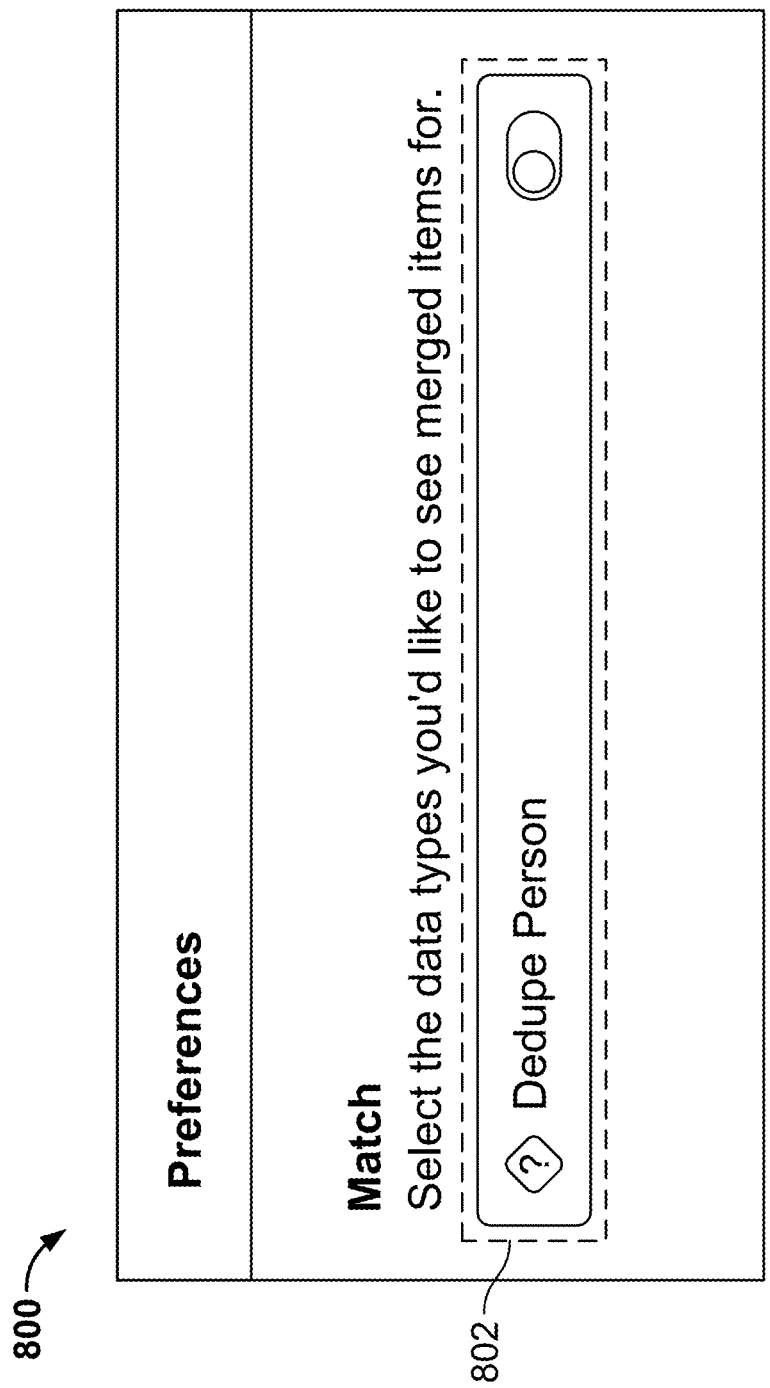
FIG. 8 is a diagram illustrating an embodiment of a user interface for selecting entity resolution preferences.

FIG. 8 is a diagram illustrating an embodiment of a user interface for selecting entity resolution preferences. In some embodiments, user interface 800 is provided by user interface service 124 of FIG. 1 as part of a graphical tool for analyzing record data. In the example shown, user interface 800 can be accessed through the preferences tab of a user interface service. User interface 800 includes toggle switch 802 for indicating the user's entity resolution preference. As shown in FIG. 8 the user can toggle deduplication to be on or off through toggle switch 802. In some embodiments, the toggle switch corresponds to a user interface service that displays entity records. For example, if toggle switch 802 is toggled to the left, deduplication is off, and entity records are displayed as individual entity records on the user interface service. If toggle switch 802 is toggled to the right, deduplication is on, and entity records are displayed as merged entity records on the user interface service. In some embodiments, user interface 800 is a component of user interface service 124 of FIG. 1, accessed via network clients such as client 102 of FIG. 1, and is used to analyze entity record data using the processes of FIGS. 2-7.

Figure 9:
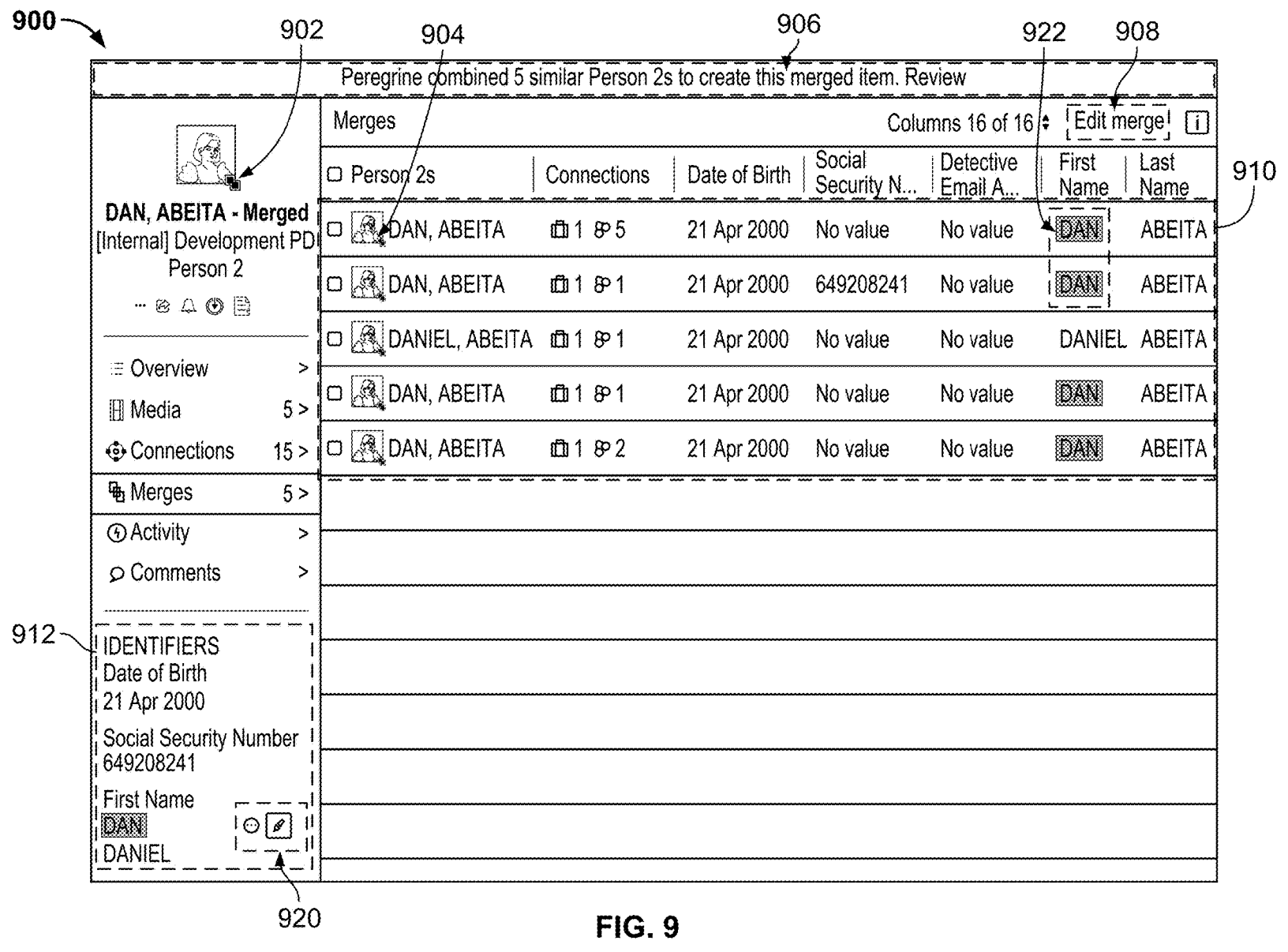

FIG. 9 is a diagram illustrating an embodiment of a user interface for visualizing a merged entity record. In some embodiments, user interface 900 is provided by user interface service 124 of FIG. 1 as part of a graphical tool for analyzing record data. In the example shown, user interface 900 is a user interface view of a merged record entity and its corresponding individual entity record data. For example, user interface 900 is of a merged record entity representing a person, and the merged individual related entity records can be viewed. In the example shown, user interface 900 includes multiple visual indicators/icons including the labeled visual indicator/icon 902 and visual indicator/icon 904 and multiple entity record analysis sections with entity record data including the labeled sections alert notification and button 904, edit merge button 908, source entity records section 910, merged entity identifiers section 912, highlight tool 920, and highlighted identifying information 922. In some embodiments, user interface 900 is a component of user interface service 124 of FIG. 1, accessed via network clients such as client 102 of FIG. 1, and is used to analyze entity record data using the processes of FIGS. 2-7.

In some embodiments, user interface 900 displays visual indicators/icons indicating whether an entity record is a merged entity record or source/individual entity record. For example, merged entity records have a different colored badge next to an identifying image of the merged entity record than that of source entity records. In the example shown, visual indicator/icon 902 indicates that the display view on user interface 900 is of a merged entity record. In some embodiments, visual indicator/icon 902 is orange in color. In the example shown, visual indicator/icon 904 indicates that the entity record is a source entity record. In some embodiments, visual icon 904 is black in color.

In some embodiments, user interface 900 provides graphical buttons that allow additional analysis of entity record data by the user. As shown in the example, user interface 900 includes alert notification and button 906, a visual indication notifying the user of the number of source entity records merged to create the merged entity record on display on user interface 900 and a button allowing the user to view the source records used to create the merged entity record. Edit merge button 908 provides the user with an analysis tool for merged entity records. Once clicked, edit merge button 908 allows the user to manually edit the merged entity record. For example, the user can add or remove source records from the merged entity record.

In some embodiments, merged entity identifiers section 912 displays aggregated entity record data for the entity of the merged entity record. In the example shown below, entity record data from source entity records section 910 is summarized and displayed in merged entity identifiers section 912. In some embodiments, the user can use highlight tool 920 to identify the source entity record in which data in the merged entity identifier section is derived from. For example, a variation of a first name is highlighted using highlight tool 920, and the corresponding entity records with the same value as the highlighted value are highlighted. Highlighted identifying information 922 includes some of the highlighted values from highlight tool 920.

Figure 10:
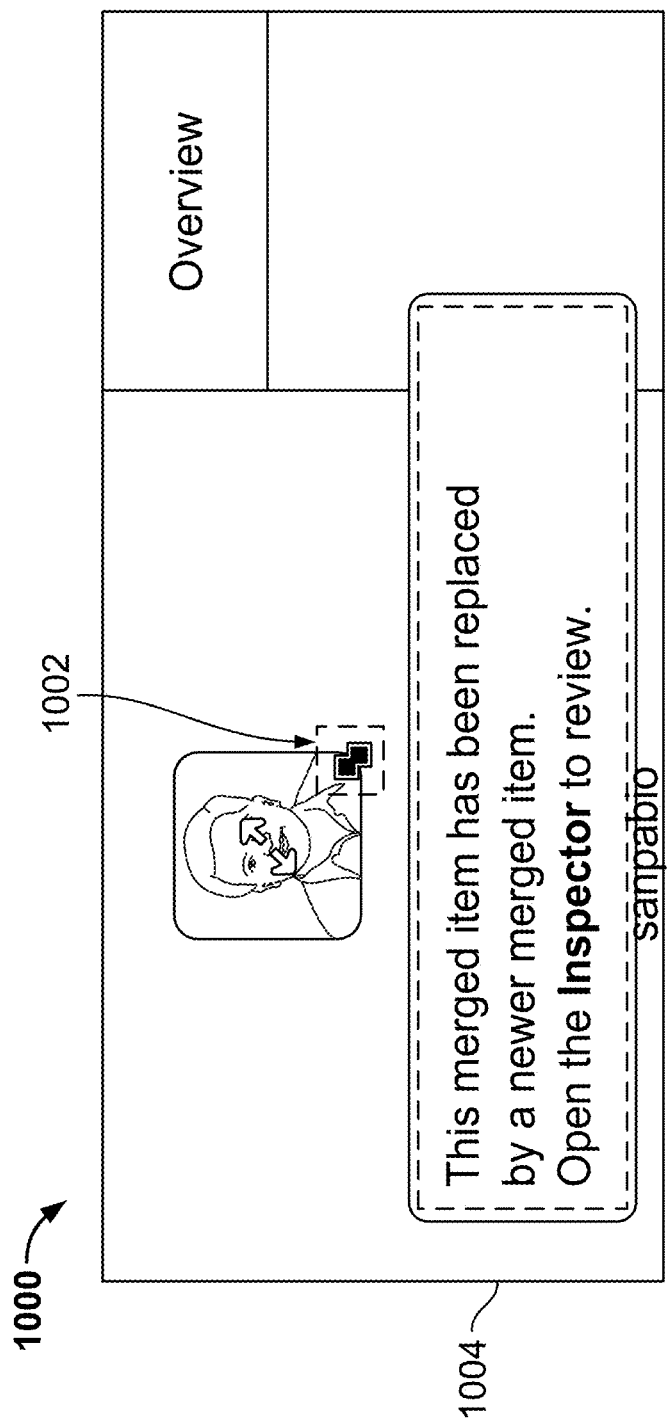
FIG. 10 is a diagram illustrating an embodiment of a user interface for displaying a replaced merged entity record.

FIG. 10 is a diagram illustrating an embodiment of a user interface for displaying a replaced merged entity record. In some embodiments, user interface 1000 is provided by user interface service 124 of FIG. 1 as part of a graphical tool for analyzing record data. In the example shown, user interface 1000 displays a merged entity record that has been replaced by a newer merged entity record (e.g., marked as replaced in 406 of FIG. 4). User interface 1000 displays an identifying image of the entity of the replaced merged entity record, visual indicator/icon 1002, and text blurb 1004. In some embodiments, visual indicator/icon 1002 is a visual icon that indicates the selected merged entity record has been modified or replaced. For example, visual indicator/icon 1002 is a black badge. In some embodiments, text blurb 1004 contains text detailing that the selected merged entity record has been replaced. In some embodiments, user interface 1000 is a component of user interface service 124 of FIG. 1, accessed via network clients such as client 102 of FIG. 1, and is used to analyze entity record data using the processes of FIGS. 2-7.

Figure 11:
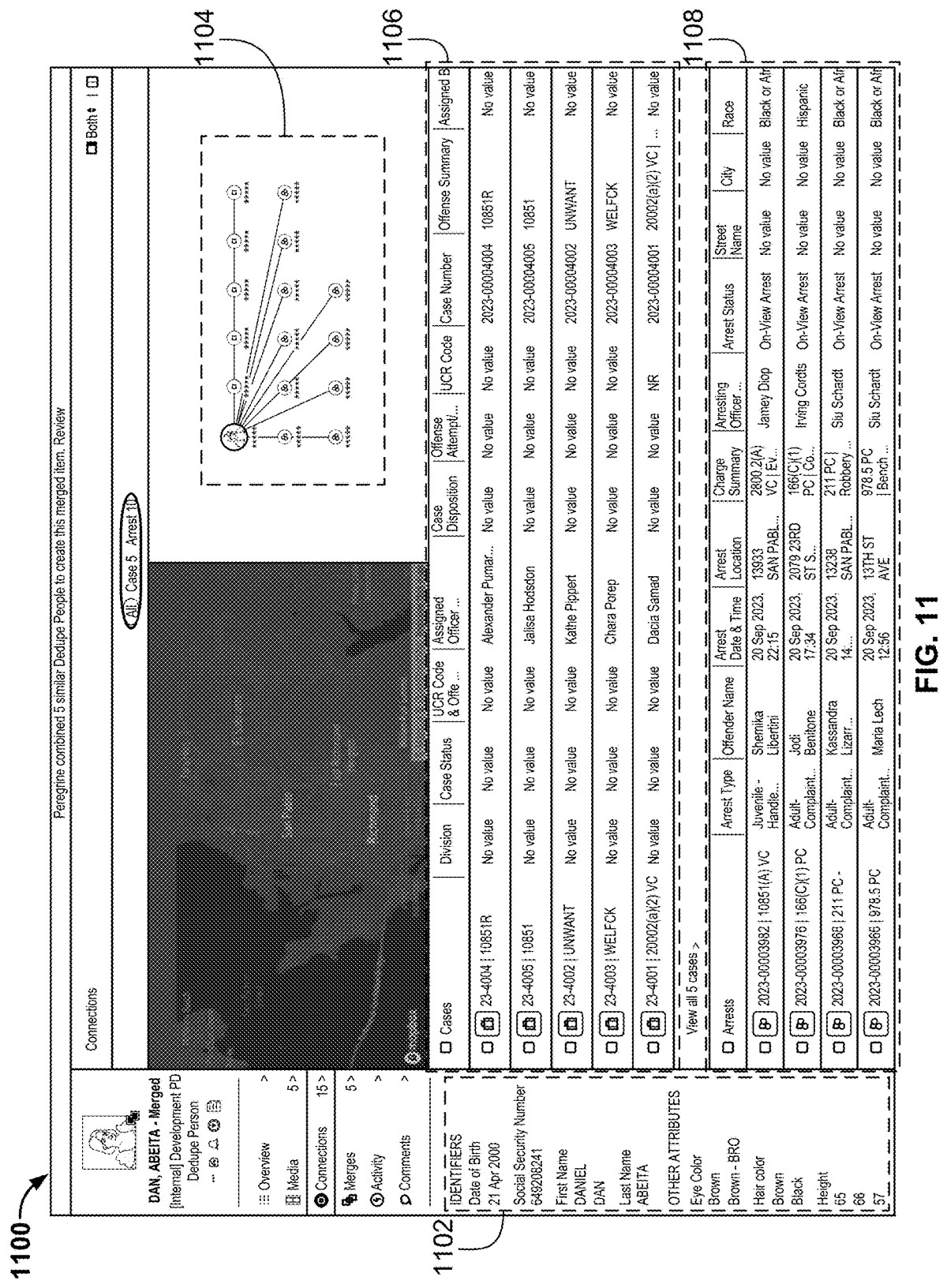

FIG. 11 is a diagram illustrating an embodiment of a user interface for visualizing a merged entity record and its connections. In some embodiments, user interface 1100 is provided by user interface service 124 of FIG. 1 as part of a graphical tool for analyzing record data. In the example shown, user interface 1100 is the connections tab of a selected merged entity record. User interface 1100 includes labeled sections merged entity identifiers section 1102, connections graph section 1104, cases section 1106, and arrests section 1108. In some embodiments, user interface 1100 is a component of user interface service 124 of FIG. 1, accessed via network clients such as client 102 of FIG. 1, and is used to analyze entity record data using the processes of FIGS. 2-7.

In some embodiments, merged entity identifiers section 1102 contains identifying information of the entity. For example, merged entity identifiers section 1102 contains fields including date of birth, social security number, first name, last name, and values for those fields gathered from the individual related entity records used to create the merged record. In some embodiments, there are multiple values for each field due to spelling or formatting differences between the individual related entity records used to create the merged record.

In some embodiments, cases section 1106 contains law enforcement cases associated with the entity. For example, the merged entity record is a person record and the person is the subject of the cases in cases section 1106. In some embodiments, arrests section 1108 contains the arrests of the person of the merged entity record. In some embodiments, cases section 1106 and arrests section 1108 can be visualized as a network graph in connections graph section 1104. For example, connections graph section 1104 lists which cases and/or arrests are connected based on identifying information and details listed in cases and/or arrests.

Figure 12:
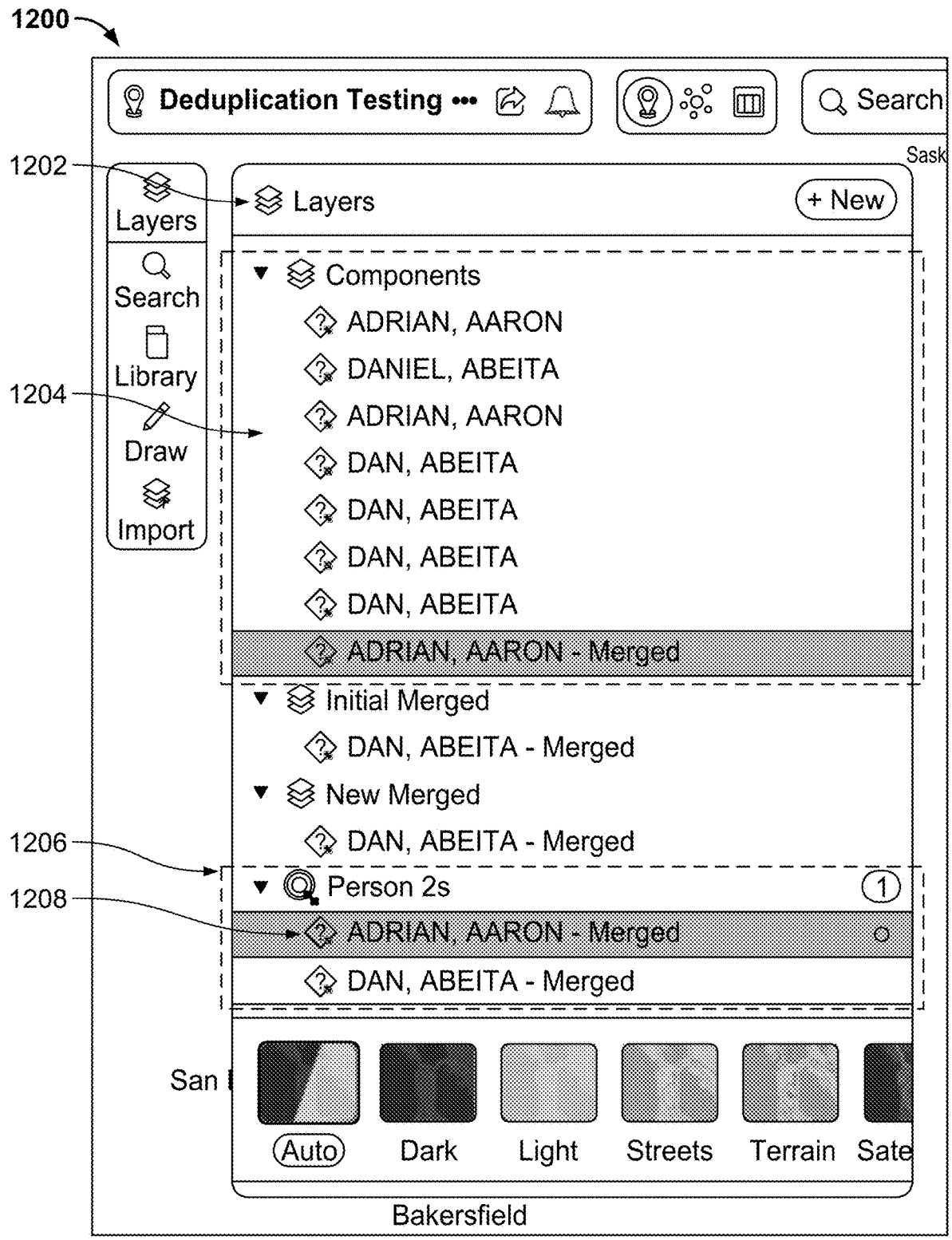
FIG. 12 is a diagram illustrating an embodiment of layers of a user interface for entity record analysis by a user or user group.

FIG. 12 is a diagram illustrating an embodiment of layers of a user interface for entity record analysis by a user or user group. In some embodiments, user interface 1200 is provided by user interface service 124 of FIG. 1 as part of a graphical tool for analyzing record data. In the example shown, user interface 1200 includes labeled sections layer view 1202, entity record components section 1204, merged entity records section 1206, and user created merged entity record 1208. In some embodiments, user interface 1200 is a component of user interface service 124 of FIG. 1, accessed via network clients such as client 102 of FIG. 1, and is used to analyze entity record data using the processes of FIGS. 2-7.

In some embodiments, layer view 1202 allows a user or user group to perform specific analysis on entity records. For example, a user can edit existing merged records, create merged records, or remove merged records within a layer view, and the changes are not available to users outside of the user group. In the example shown, layer view 1202 is comprised of components section 1204 and merged entity records section 1206. Components section 1204 lists the individual related entity records in the specific analysis and merged entity records section 1206 lists the merged entity records in the specific analysis. In some embodiments, a user can create merged entity records within layer view 1202 and the merged entity record appears under merged entity records section 1206 and not outside the specific analysis. For example, user created merged entity record 1208 is a merged entity record that does not exist outside of the specific analysis because a user created the merged entity record within layer view 1202.

Figure 13:
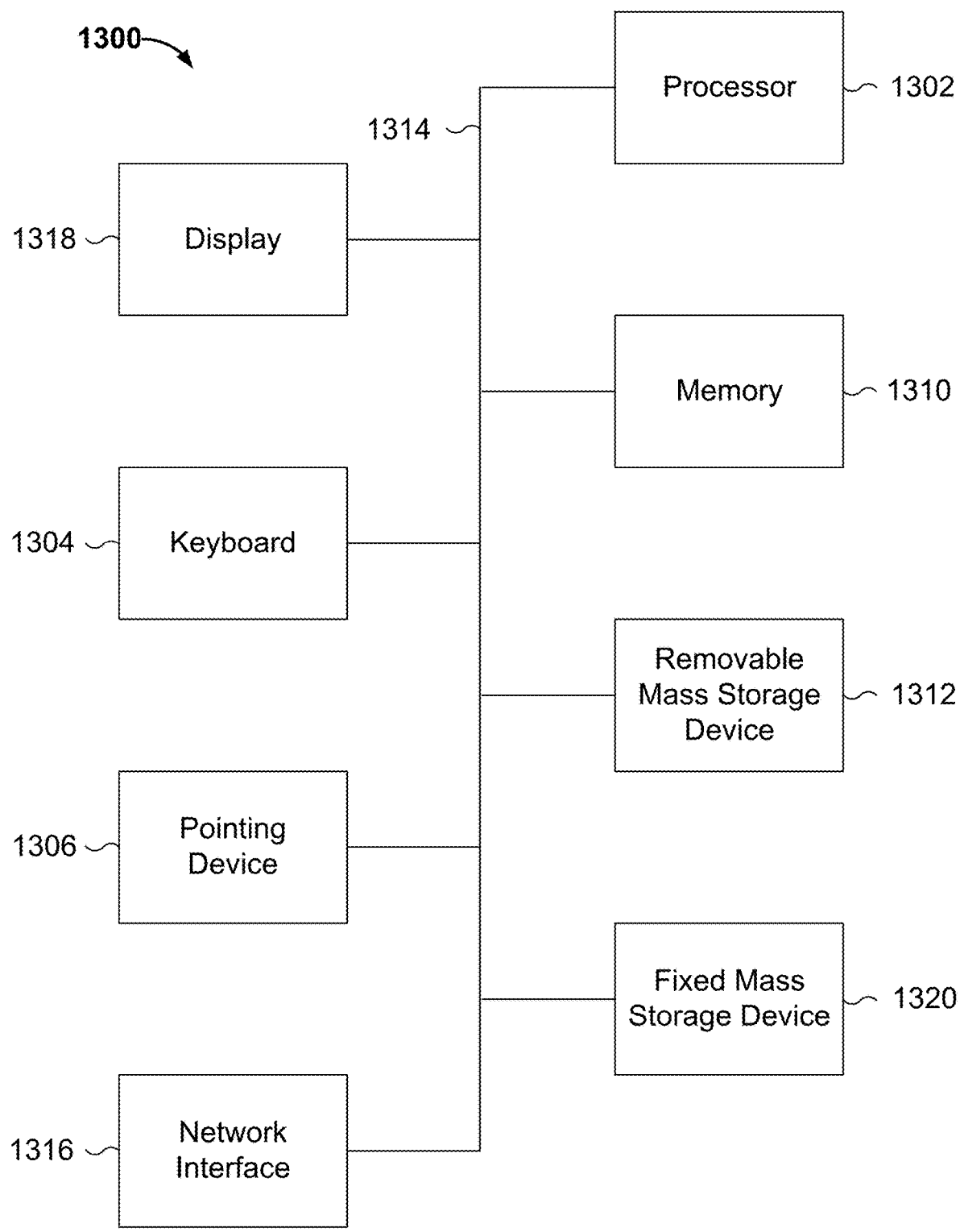
FIG. 13 is a functional diagram illustrating a programmed computer system for performing related entity record resolution and entity resolution using machine learning embeddings.

FIG. 13 is a functional diagram illustrating a programmed computer system for performing related entity record resolution and entity resolution using machine learning embeddings. As will be apparent, other computer system architectures and configurations can be utilized for performing related entity record resolution and entity resolution using machine learning models. Examples of computer system 1300 include client 102 of FIG. 1, one or more computers used to implement data source 106 and data source 108 of FIG. 1, one or more computers used to implement data analysis and management platform 112 of FIG. 1, one or more computers used to implement data analysis and management platform 112 of FIG. 1, one or more computers use to implement user interface service 124 of FIG. 1, and one or more computers used to implement data repository 126 of FIG. 1. Computer system 1300, which includes various subsystems as described below, includes at least one microprocessor subsystem (also referred to as a processor or a central processing unit (CPU)) 1302. For example, processor 1302 can be implemented by a single-chip processor or by multiple processors. In some embodiments, processor 1302 is a general purpose digital processor that controls the operation of the computer system 1300. Using instructions retrieved from memory 1310, the processor 1302 controls the reception and manipulation of input data, and the output and display of data on output devices (e.g., display 1318). In various embodiments, one or more instances of computer system 1300 can be used to implement at least portions of the processes of FIGS. 2 through 7.

Processor 1302 is coupled bi-directionally with memory 1310, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1302. Also as is well known in the art, primary storage typically includes basic operating instructions, program code, data and objects used by the processor 1302 to perform its functions (e.g., programmed instructions). For example, memory 1310 can include any suitable computer-readable storage media, described below, depending on whether, for example, data access needs to be bi-directional or unidirectional. For example, processor 1302 can also directly and very rapidly retrieve and store frequently needed data in a cache memory (not shown).

A removable mass storage device 1312 provides additional data storage capacity for the computer system 1300, and is coupled either bi-directionally (read/write) or unidirectionally (read only) to processor 1302. For example, storage 1312 can also include computer-readable media such as magnetic tape, flash memory, PC-CARDS, portable mass storage devices, holographic storage devices, and other storage devices. A fixed mass storage 1320 can also, for example, provide additional data storage capacity. The most common example of mass storage 1320 is a hard disk drive. Mass storages 1312, 1320 generally store additional programming instructions, data, and the like that typically are not in active use by the processor 1302. It will be appreciated that the information retained within mass storages 1312 and 1320 can be incorporated, if needed, in standard fashion as part of memory 1310 (e.g., RAM) as virtual memory.

In addition to providing processor 1302 access to storage subsystems, bus 1314 can also be used to provide access to other subsystems and devices. As shown, these can include a display monitor 1318, a network interface 1316, a keyboard 1304, and a pointing device 1306, as well as an auxiliary input/output device interface, a sound card, speakers, and other subsystems as needed. For example, the pointing device 1306 can be a mouse, stylus, track ball, or tablet, and is useful for interacting with a graphical user interface.

The network interface 1316 allows processor 1302 to be coupled to another computer, computer network, or telecommunications network using a network connection as shown. For example, through the network interface 1316, the processor 1302 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1302 can be used to connect the computer system 1300 to an external network and transfer data according to standard protocols. For example, various process embodiments disclosed herein can be executed on processor 1302, or can be performed across a network such as the Internet, intranet networks, or local area networks, in conjunction with a remote processor that shares a portion of the processing. Additional mass storage devices (not shown) can also be connected to processor 1302 through network interface 1316.

An auxiliary I/O device interface (not shown) can be used in conjunction with computer system 1300. The auxiliary I/O device interface can include general and customized interfaces that allow the processor 1302 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 13 is but an example of a computer system suitable for use with the various embodiments disclosed herein. Other computer systems suitable for such use can include additional or fewer subsystems. In addition, bus 1314 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a plurality of entity records;
   extracting certain fields of the plurality of entity records into a version of the plurality of entity records;
   using a first machine learning model to embed the version of the plurality of entity records into numerical embeddings having multidimensional numerical values representing the version of the plurality of entity records;
   using the numerical embeddings to determine candidate relationships between the plurality of entity records;
   filtering the numerical embeddings based candidate relationships using one or more filtering rules to determine a refined candidate relationships set for computational efficiency;
   analyzing using a second machine learning model the refined candidate relationships set to determine one or more groups of related entity records included in the plurality of entity records, wherein each of the one or more groups of related entity records identify a corresponding common underlying entity; and
   for a specific entity record group included in the determined one or more groups of related entity records, creating a new merged entity record that merges elements of individual related entity records included in the specific entity record group.

2. The method of claim 1, wherein the plurality of entity records is placed in a data stream pipeline.

3. The method of claim 1, wherein the version of the plurality of entity records is determined by transforming the plurality of entity records from different data sources into a standardized format.

4. The method of claim 1, wherein the version of the plurality of entity records is determined by transforming each of the plurality of entity records into a corresponding serialized string.

5. The method of claim 1, wherein the version of the plurality of entity records is determined including by extracting content of a subset of specified fields in an entity record included in the plurality of entity records and serializing the extracted content.

6. The method of claim 1, wherein the first machine learning model is a Bidirectional Encoder Representations from Transformers language model custom trained to embed entity record data.

7. The method of claim 1, wherein using the embeddings to determine the candidate relationships between the plurality of entity records includes determining a measure of embedding similarity between the plurality of entity records.

8. The method of claim 1, wherein filtering the numerical embeddings based candidate relationships includes determining that a candidate relationship included in the candidate relationships is not to be included in the refined candidate relationships set.

9. The method of claim 1, wherein the first machine learning model and the second machine learning model are different models.

10. The method of claim 1, wherein analyzing the refined candidate relationships set includes clustering matched entity record pairs in the refined candidate relationships set into the determined one or more groups of related entity records.

11. The method of claim 1, wherein the plurality of entity records is from a plurality of different records management systems.

12. The method of claim 1, wherein the plurality of entity records is person records.

13. The method of claim 1, wherein the plurality of entity records is associated with real world objects for law enforcement.

14. A system, comprising:
    one or more processors configured to:
      receive a plurality of entity records;
      extract certain fields of the plurality of entity records into a version of the plurality of entity records;
      use a first machine learning model to embed the version of the plurality of entity records into numerical embeddings having multidimensional numerical values representing the version of the plurality of entity records;
      use the numerical embeddings to determine candidate relationships between the plurality of entity records;
      filter the numerical embeddings based candidate relationships using one or more filtering rules to determine a refined candidate relationships set for computational efficiency;
      analyze using a second machine learning model the refined candidate relationships set to determine one or more groups of related entity records included in the plurality of entity records, wherein each of the one or more groups of related entity records identify a corresponding common underlying entity; and
      for a specific entity record group included in the determined one or more groups of related entity records, create a new merged entity record that merges elements of individual related entity records included in the specific entity record group; and
    a memory coupled to at least one of the one or more processors and configured to provide the at least one of the one or more processors with instructions.

15. The system of claim 14, wherein the version of the plurality of entity records is determined by transforming the plurality of entity records from different data sources into a standardized format.

16. The system of claim 14, wherein using the embeddings to determine the candidate relationships between the plurality of entity records includes determining a measure of embedding similarity between the plurality of entity records.

17. The system of claim 14, wherein filtering the numerical embeddings-based candidate relationships includes determining that a candidate relationship included in the candidate relationships is not to be included in the refined candidate relationships set.

18. The system of claim 14, wherein the first machine learning model and the second machine learning model are different models.

19. The system of claim 14, wherein analyzing the refined candidate relationships set includes clustering matched entity record pairs in the refined candidate relationships set into the determined one or more groups of related entity records.

20. A computer program product, the computer program product being embodied in a non-transitory computer readable storage medium and comprising computer instructions for:

receiving a plurality of entity records;

extracting certain fields of the plurality of entity records into a version of the plurality of entity records;

using a first machine learning model to embed the version of the plurality of entity records into numerical embeddings having multidimensional numerical values representing the version of the plurality of entity records;

using the numerical embeddings to determine candidate relationships between the plurality of entity records;

filtering the numerical embeddings based candidate relationships using one or more filtering rules to determine a refined candidate relationships set for computational efficiency;

analyzing using a second machine learning model the refined candidate relationships set to determine one or more groups of related entity records included in the plurality of entity records, wherein each of the one or more groups of related entity records identify a corresponding common underlying entity; and for a specific entity record group included in the determined one or more groups of related entity records, creating a new merged entity record that merges elements of individual related entity records included in the specific entity record group.

\* \* \* \* \*